G. CATCHPOLE.
Straw Cutter.
No. 4,747.  Patented Sept. 5, 1846.
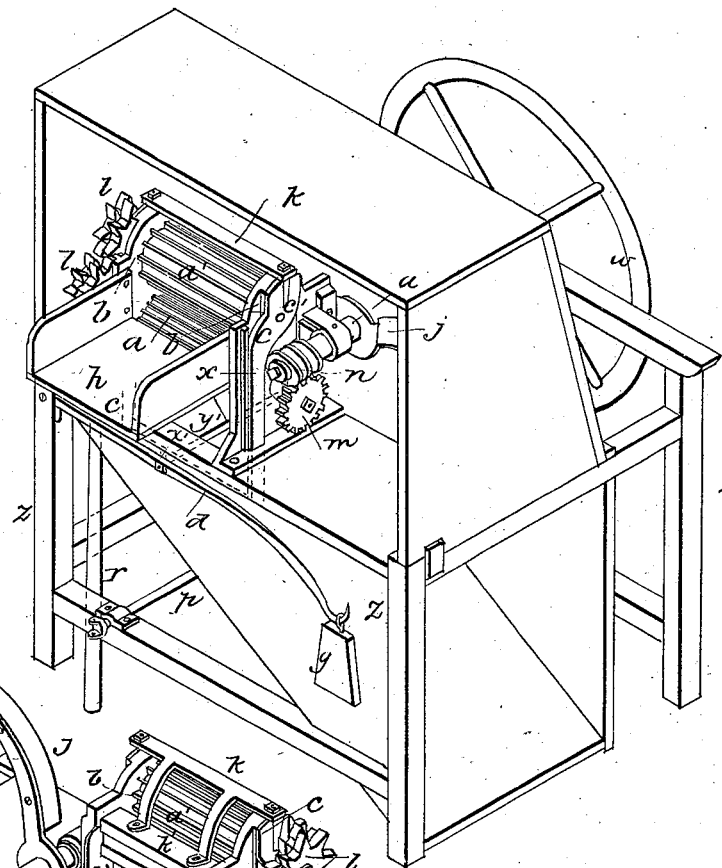
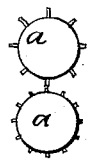
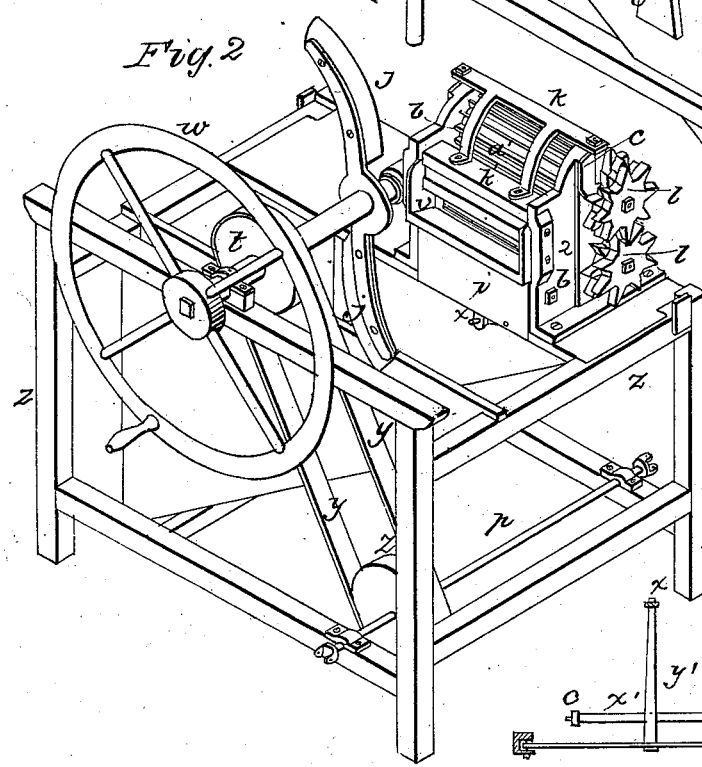
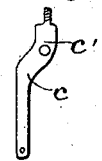

UNITED STATES PATENT OFFICE.

G. CATCHPOLE, OF GENEVA, NEW YORK.

STRAW-CUTTER.

Specification of Letters Patent No. 4,747, dated September 5, 1846.

*To all whom it may concern:*

Be it known that I, G. CATCHPOLE, of Geneva, in the county of Ontario and State of New York, have invented a new and useful Improvement in Straw-Cutters, and that the following is a full, clear, and exact description of the principle or character thereof which distinguishes it from all other things before known and of the manner of making, constructing, and using the same, reference being had to the accompanying drawings, making part of this specification, in which—

Figure 1 is a perspective view of the machine taken from the feeding side, and Fig. 2, a perspective view from the opposite side with the cap removed.

The same letters indicate like parts in both figures.

It has heretofore been found difficult to construct straw cutters with sufficient strength and simplicity to be driven by horse or other power, which at the same time could be worked by hand. This I have effected in a simple and efficient manner by the following described construction. I form an oblong box, lettered (*z*) in the drawings, consisting of four posts and four cross ties; the two front posts are higher than the back ones and they are all connected by plates; two additional bars extend across from one side to the other parallel with the front and back plates which divide the top into three equal parts, and on the back plate and bar the feeding apparatus sits, and is firmly bolted. This part of the machine consists of two side plates (*b*) connected by a front plate (*i*) which connects them at the bottom. In each of these side plates are bearings for the lower feed roller (*a*) which is stationary, and above them are vertical slits 3 (see Fig. 7, which is plate *b* detached) for the upper roller to slide in; behind these slits 3 on the outside of the plate are grooves (2) in which the sides (*c*) see Fig. 6 of a gate in which the top roller *a'* is hung its journals passing through the slit 3, in plate (*b*) and into (*c*) at (*c'*) slide up and down; these sides (*c*) are connected at the top by a cross piece (*k*) see Fig. 2, from which two arms project downward over the upper roller in front and to them is attached a block (*k'*) which is made to move up and down with the gate; below the side plates (*b*) above named the sides (*c*) of the gate are connected together by a cross bar (*x'*) shown by dotted lines in Fig. 1 and in plan in the diagrams, Fig. 4, which cross bar is borne down by a lever of the first order (*y'*) whose fulcrum is at (*x*), (this fulcrum is also shown in Fig. 2); another lever (*d*) also of the first order bears down the end of a lever (*y'*) with a force due to the weight (*g*) or a spring attached to the movable end thereof; (this last named lever is clearly shown in Fig. 1). By the above arrangement the upper roller (*a'*) and front block (*k'*) are held down with sufficient force while they have a sufficient upward motion to admit the feed.

The upper roller (*a'*) is armed with a series of radial plates that extend from one end to the other parallel with the axis as shown in Fig. 5, the under roller (*a*) is furnished with similar plates but they do not project out more than one third the distance from the surface and are more numerous. By this contrivance the upper roller tends to feed faster than the lower one, and thus prevents the machine from clogging below—a very general defect in similar machines. The two rollers are geared together with double miter wheels (*l*) see Fig. 2, in the ordinary way.

On the end of the lower roller opposite to the miter wheel there is a spur wheel (*m*), Fig. 1, into which a worm wheel (*n*) works, which last named wheel is on a horizontal axle (*o*) placed at right angles to the roller and projecting out in front of the mouth of the feeding apparatus; one bearing in which the axle (*o*) turns is affixed to one of the side pieces (*b*), the other is in the front cap piece of the frame beyond which it projects far enough to attach a balance wheel (*w*) thereto with a handle to turn it by. Within the front cap piece a pulley (*t*) is fixed on the axle, and beyond it are one or more curved arms to which similarly shaped knives (*j*) are attached which revolve just in front of the mouth of the feeding part of the machine and cutting from heel to point—the feeding box (*h*) is placed behind the rollers one end resting on the frame, the other supported by a leg (*r*); it is of the usual construction and can be readily removed from the machine.

On the lower cross ties of the frame, when the machine is driven by horse power, a shaft (*p*) is supported parallel to axle (*o*)

with which it is connected by a band (*y*) that passes around pulley (*t*) on shaft (*p*), it will however be obvious that they can be connected by spur wheels instead of the band and pulleys; the lower shaft (*p*) is coupled at either end with a horse power when it is to be driven thereby.

Having thus fully described by improvements, what I claim therein as new and desire to secure by Letters Patent is—

1. The combination of the sliding gate, front block (*k'*) attached thereto in a stationary manner, and top roller, in the manner described, the said gate sliding in grooves in the outside plates of the frame, by which it is steadied and directed.

2. I claim constructing the rollers, as herein described so that the top roller gathers in faster than the bottom, to prevent clogging, in the manner set forth.

GEORGE CATCHPOLE.

Witnesses:
A. P. BROWNE,
CHS. M. KELLER.